No. 744,972. PATENTED NOV. 24, 1903.
H. E. MOOMAW.
STOVEPIPE JOINT.
APPLICATION FILED SEPT. 15, 1903.
NO MODEL.
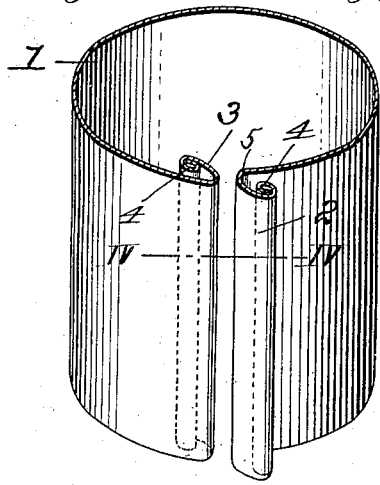
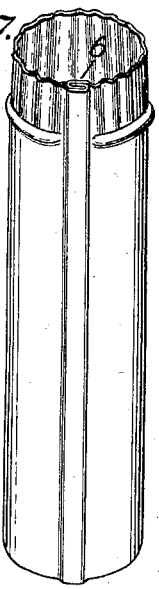
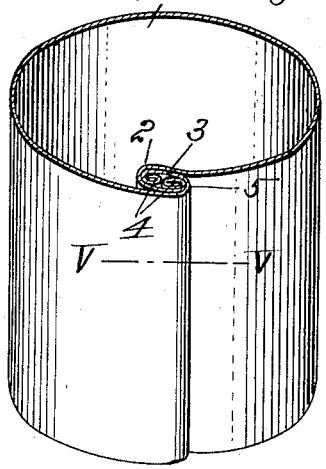
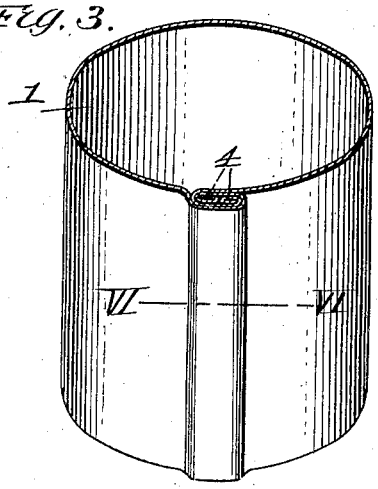
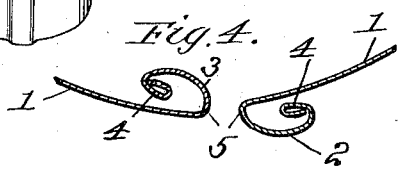
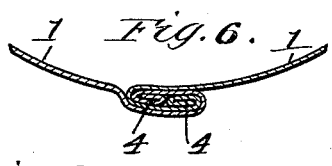
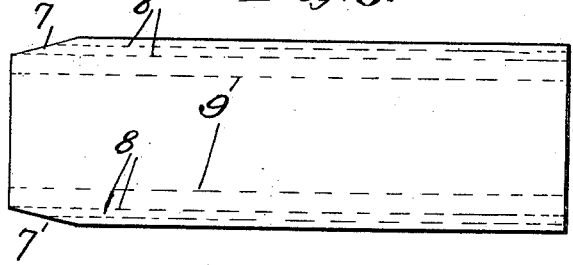
Witnesses
Edwin L. Yewell
R. W. Bishop
Inventor,
Henry E. Moomaw,
By his Attorneys Davis & Davis.
THE NORRIS PETERS CO., PHOTO-LITHO., WASHINGTON, D. C.

No. 744,972. Patented November 24, 1903.

UNITED STATES PATENT OFFICE.

HENRY E. MOOMAW, OF CHATTANOOGA, TENNESSEE.

STOVEPIPE-JOINT.

SPECIFICATION forming part of Letters Patent No. 744,972, dated November 24, 1903.

Application filed September 15, 1903. Serial No. 173,305. (No model.)

*To all whom it may concern:*

Be it known that I, HENRY E. MOOMAW, a citizen of the United States, residing at Chattanooga, county of Hamilton, State of Tennessee, have invented certain new and useful Improvements in Stovepipe-Joints, of which the following is a specification, reference being had therein to the accompanying drawings, in which—

Figure 1 is a sectional perspective view of a stovepipe-section, showing the joint in its unlocked position; Fig. 2, a similar view showing the two members of the joint interlocked; Fig. 3, a similar view showing the members of the joint locked and compressed to hold the joint permanently connected; Fig. 4, a horizontal sectional view on the line IV IV of Fig. 1; Fig. 5, a similar view on the line V V of Fig. 2; Fig. 6, a similar view on the line VI VI of Fig. 3; Fig. 7, a detail perspective view of a stovepipe-section, showing one end tapered, the interlocking beads being cut away at the tapered end; and Fig. 8, a view of a blank from which the stovepipe-section is formed.

Stovepipes as supplied to the merchants by manufacturers are usually in a knockdown condition—that is, the longitudinal seam is not completed—and the sections of stovepipe in this condition are nested—that is, the sections are placed one within another—in order to economize space in shipping. The retail merchant or tinsmith completes the stovepipe-sections by interlocking and pressing together the two members of the longitudinal seam to permanently secure them together.

It is the main object of this invention to provide a seam or joint for stovepipe-sections which may be readily assembled or interlocked by the retail merchant or tinsmith and which when permanently connected together will absolutely prevent the collapsing of the stovepipe under an external strain, such as fitting together the ends of two sections or the expansion thereof from any strain exerted on its interior.

With this object in view the invention consists of the novel form of seam herein shown and described.

Referring to the various parts by numerals, 1 designates the body portion of the stovepipe-section, one of whose longitudinal edges is bent outward and then back upon the main body portion to form the hook-like flange 2 of the lock-joint, the other longitudinal edge of the body portion being bent inward and back upon the body portion to form the hook-flange 3 of the other member of the lock-joint. The free edges of these hook-flanges are each bent inward to form the flat beads 4, which lie close against the inner sides of the said flanges between them and the body portion of the pipe. The bead formed on the inner side of the flange 2 of the joint is adjacent the outer surface of the main pipe-section and the other bead being adjacent the inner surface of the pipe, both of said beads preferably extending the entire length of the pipe-section. The beads 4 are practically one-half as wide as the hook-flanges and are preferably formed by folding the longitudinal edges of the sheet metal from which the stovepipe-section is to be made over and over once or twice in order to secure the proper thickness of bead. These folds are preferably made open—that is, with a slight space between them—in order that when the joint is flattened out, as hereinafter described, the beads will be slightly increased in width and the various folds of metal therein will be brought in close contact with each other.

In assembling the members of this joint to complete the stovepipe-pipe section the hook-flanges or main portions 2 and 3 are interlocked, as shown clearly in Fig. 2 of the drawings. It will be noted that in this position of the parts the beads 4 of one hook or portion 2 substantially fill the space between the inner edge of the other bead and the curved part of the hook, so that when the joint is flattened by hammering or in any other suitable manner and said beads are slightly increased in width they will fit tightly in place and prevent any movement of either member of the joint. By reference to Fig. 3 it will be seen that the free or adjacent edges of the beads abut closely together and that the edges of the hook-flanges 2 fit snugly within the hook-flange of the opposite edge of the pipe-section. It will thus be seen that when the joint is completed there can be no expansion of the pipe at the joint and that said pipe cannot be compressed or collapsed by external pressure.

If desired, the beads may be cut away near one end of each pipe-section, as shown at 6 in Fig. 7, in order to reduce the thickness of the joint, and thereby permit that end of the stovepipe-section to more readily fit into the adjoining end of another stovepipe-section. It will also be readily understood that the beads may be formed by as many turns or folds of metal as may be desired or found necessary to secure the desired thickness of bead and strength of joint. When the beads are to be cut away at one end of the pipe, as in Fig. 7, a blank, such as illustrated in Fig. 8, is used. This blank is cut out, as at 7, at one end and is then folded on the dotted lines 8 to form the beads. It is then folded on the lines 9 to form the hook-flanges, one of said flanges being folded inward to form the flange 3 and the other being folded outward to form the flange 2. At the point where the beads are cut away the joint will be simply an interlocking one, and at this point the pipe may be crimped or tapered in any suitable manner in order to adapt that end to be inserted within the end of an adjoining section.

From the foregoing it will be readily understood that I produce a stovepipe-joint which may be readily assembled by the retail merchant or tinsmith and which when permanently connected will form an extremely strong and durable joint which will not separate under an external pressure or permit the pipe to expand under an internal pressure. A joint constructed as herein described will be extremely simple, and therefore cheap to manufacture.

While I have described my invention as applied to stovepipes, it will be readily understood that it will make an extremely-desirable joint for use on other forms of pipes—such as steam-exhaust pipes, smoke-stacks, and metallic pipe-coverings.

Having thus described my invention, what I claim as new, and desire to secure by Letters Patent, is—

1. A pipe-section formed of sheet metal and provided along one of its longitudinal edges with an outward-turned hook-flange which extends back upon the main portion of the pipe a suitable distance, and on its other edge with a corresponding inturned hook-flange which lies within the pipe-section, and inward-extending beads formed on the free edges of these flanges, said beads lying between the hook-flanges and the main portion of the pipe-section, and said flanges being adapted to interlock one within the other and the beads to lie parallel and to abut at their free edges to prevent any lateral movement of the hook-flanges.

2. A pipe-section formed of sheet metal and provided along one of its longitudinal edges with an outward-turned hook-flange which extends back upon the main portion of the pipe a suitable distance, and on its other edge with a corresponding inturned hook-flange which lies within the pipe-section, and inward-extending beads formed on the free edges of these flanges by folding the edges of the metal, said beads lying between the hook-flanges and the main portion of the pipe-section, and said flanges being adapted to interlock one within the other and the beads to lie parallel and to abut at their free edges to prevent any lateral movement of the hook-flanges.

3. A pipe-section formed of sheet metal and provided along one of its longitudinal edges with an outward-turned hook-flange which extends back upon the main portion of the pipe a suitable distance, and on its other edge with a corresponding inturned hook-flange which lies within the pipe-section, and inward-extending beads formed on the free edges of these flanges by openly folding the edges of the sheet metal whereby said beads will expand laterally or widen when the joint is compressed, said beads lying between the hook-flanges and the main portion of the pipe-section, and said flanges being adapted to interlock one within the other and the beads to lie parallel and to abut at their free edges to prevent any lateral movement of the hook-flanges.

4. A pipe-section formed of sheet metal and provided along one of its longitudinal edges with an outward-turned hook-flange which extends back upon the main portion of the pipe a suitable distance, and on its other edge with a corresponding inturned hook-flange which lies within the pipe-section, and inward-extending beads formed on the free edges of these flanges by loosely folding the edges of the sheet metal whereby said beads will expand laterally or widen when the joint is compressed, said beads lying between the hook-flanges and the main portion of the pipe-section, and said flanges being adapted to interlock one within the other and the beads to lie parallel and to abut at their free edges to prevent any lateral movement of the hook-flanges, the inner beads or open expansible folds being cut away at one end of the pipe-section, leaving only the single or hooked flanges in that end, substantially as described, and for the purpose set forth.

In testimony whereof I hereunto affix my signature, in the presence of two witnesses, this 12th day of September, 1903.

HENRY E. MOOMAW.

Witnesses:
S. S. MORROW,
R. B. DEANES.